United States Patent [19]

Snowman

[11] 4,226,533
[45] Oct. 7, 1980

[54] OPTICAL PARTICLE DETECTOR

[75] Inventor: Lawrence R. Snowman, Liverpool, N.Y.

[73] Assignee: General Electric Company, Syracuse, N.Y.

[21] Appl. No.: 941,431

[22] Filed: Sep. 11, 1978

Related U.S. Application Data

[63] Continuation-in-part of Ser. No. 757,605, Jan. 7, 1977, abandoned.

[51] Int. Cl.³ .............................................. G08B 17/10
[52] U.S. Cl. ................................... 356/338; 250/574; 340/630
[58] Field of Search ................ 350/189; 356/337–341, 356/437, 438; 250/353, 574; 340/630

[56] References Cited
U.S. PATENT DOCUMENTS

| | | | |
|---|---|---|---|
| 3,361,030 | 1/1968 | Goldberg | 356/103 |
| 3,368,078 | 2/1968 | Fliut et al. | 250/353 |
| 3,431,423 | 3/1969 | Keller | 356/103 |
| 3,630,617 | 12/1971 | Marrett | 356/103 |

*Primary Examiner*—John K. Corbin
*Assistant Examiner*—Bruce Y. Arnold
*Attorney, Agent, or Firm*—Richard V. Lang; Carl W. Baker; Philip L. Schlamp

[57] ABSTRACT

An optical particle detector is disclosed using a dark field optical system in which an air sample is illuminated and forward scattered light is collected in a zone centered about but excluding on-axis light. The collected light is then sensed to detect the presence of air borne light scattering particles. Particles of greatest interest are smoke particles. The system includes a self-contained light source and a photo detector suitable for operation by a dry cell. The optics are designed for high light gathering efficiency consistent with minimum space requirements and the internal design minimizes scattered light to achieve maximum smoke detection sensitivity.

6 Claims, 4 Drawing Figures

OPTICAL PARTICLE DETECTOR

This is a continuation in part of co-pending patent application Ser. No. 757,605, entitled "Optical Smoke Detector" by Lawrence R. Snowman, filed Jan. 7, 1977 now abandoned.

BACKGROUND OF THE INVENTION

1. Field of the Invention

The present invention relates to smoke detectors in which the presence of smoke is sensed by directing a beam of light into the smoke and sensing the light scattered. The invention also relates to dark field optical systems in which light scattering is reduced to darken the field. The invention also relates to the design of illuminating and light collecting optical elements.

2. Description of the Prior Art

Smoke detectors available for home use currently fall into two categories. Those which are of the ionization type, and those which are of the optical type. The present invention deals with a smoke detector of the optical type.

The conventional optical smoke detector contains a light source which illuminates a sample of air potentially containing smoke. If smoke is present, light is scattered in all directions from the scattering particles. In known optical systems, the collection is at an off-axis position to one side of the beam. It is known that the scattering flux is very much a function of the scattering angle. For instance, back scattering is relatively weak, side scattering reaches a minimum value, and forward scattering is relatively strong. The scattering efficiency varies through nearly two orders of magnitude as one goes from side scattering (perpendicular to the beam) to forward scattering in substantial alignment with the beam. Since this principle has been known, a system has been proposed in which the main illuminating beam is obscured by a stop and light is collected by a lens placed off the illuminating axis, behind a stop. In such off-axis systems, the scattered light collection solid angles are small and the light detection efficiency low since only a small part of the scattered light is collected.

SUMMARY OF THE INVENTION

It is an object of the present invention to provide an improved particle detector in which a gaseous sample is illuminated and light scattered by any suspended particles is sensed to detect their presence in the gaseous sample.

It is a further object of the present invention to provide a compact optical particle detector in which the optical efficiency is optimized.

It is an object of the present invention to provide an improved smoke detector of the type which senses light scattered by particles of smoke.

It is still another object of the present invention to provide an improved smoke detector of the type which senses light scattered in a forward direction by particles of smoke and which uses a dark field optical system.

It is still another object of the present invention to provide a smoke detector of the type which senses scattered light and which has a self-contained light source, the detector being suitable for battery operation.

These and other objects of the present invention are achieved in a novel smoke detector using a dark field optical system in which an air sample is illuminated and forward scattered light is collected in a zone centered about but excluding on-axis-light. The collected light is then sensed to detect the presence of smoke. The smoke detector comprises a measurement chamber into which airborne particles of combustion are admitted, and which excludes light except at an entrance aperture at one end and at a zonal exit aperture containing a central stop at the other end. The measurement chamber also has an internal aperture which together with the other two apertures and stop are oriented perpendicularly to the axis of the detector and centered thereon.

The smoke detector also includes means for projecting a beam of light along the axis, through the entrance aperture and into the measurement chamber for illuminating any smoke particles present in the chamber, the beam passing through the internal apertures and being intercepted by the central stop. An output lens is provided arranged in the zonal exit aperture for collecting scattered light throughout the zone, the lens being blocked to the rays of the beam by the internal aperture and the stop, but collecting forward scattered light when airborne scattering particles are present. Finally, the smoke detector includes a light detector arranged on the axis, behind the output lens for sensing the scattered light collected by the output lens.

In accordance with another aspect of the invention, an anterior chamber is provided from which airborne particles of combustion are excluded and from which light is excluded except for an exit aperture opening into the measurement chamber. The beamforming means comprises a light emitting diode having a condensing lens which is formed integrally with the light emitting diode and which creates a divergent beam. The divergent beam is concentrated into a narrower beam by the beamforming lens. Preferably, the integral condensing lens is set in a circular aperture for defining the edges of the light source. The beamforming lens forms an image of the bounded virtual source in the plane of the internal aperture. In this way, the limits of the image of the virtual source are well defined, and when smaller than the internal apertures, illumination of the edges of the aperture are avoided. This edge illumination should be avoided to keep the field of the detector dark. The beamforming lens is arranged to collect widely diverging light from the source. Since spheric aberration under these circumstances substantially enlarges the image of the virtual source, the beamforming lens is of an aspheric design. The exact curvature of the lens is calculated to correct spherical aberration in the indicated source and image positions so as to improve the sharpness of the image of the virtual source formed in the internal aperture of the measurement chamber. As will be shown, this leads to an increase in the sensitivity of the system.

To further darken the field, both the anterior and the measurement chambers, which are of generally cylindrical shape, have a low light reflectance interior. Each contains at least one baffle extending inwardly from the cylindrical walls to reduce the amount of light scattered into the beamforming lens or the output optics. As a further step in darkening the field, the central stop is conical, made entrant into the output lens, and given an opaque, low reflectance interior to reduce the amount of light scattered into the output lens.

In accordance with another aspect of the invention, the output lens is a three element annular lens of high power, having at least one aspheric surface to correct spherical aberration and sharpen the image of the scattered light focused on the photo detector. More specifically, the front surface of the first element of the output lens is of low power to facilitate collection of highly divergent light, and the back surface of the first element is aspheric and of higher power than the front surface. The back surface of the second element is of low power to facilitate a large convergence angle toward the detector and the front surface of the second element is of higher power than the back surface. The third lens element of the output lens is a hemispheric immersion lens, coupling light over a wide angle to the small light detector.

In accordance with a further object of the invention, and in the interests of achieving a compact design of maximum sensitivity, the individual parameters of the optical particle detector have been optimized with the available dimensional limitations and lens truncation has been used. More particularly, it has been discovered that the efficiency of scattering is so strongly angle dependent that the parameter having the strongest influence on performance is the diameter of the central stop in the output lens. The other parameters of the system, including the spacing between elements, and the diameter of the aperture stops, on which other parameters the diameter of the central stop is dependent, are selected for performance optimization. Together with the use of truncation in the output lens, a very compact design with excellent sensitivity has been achieved.

BRIEF DESCRIPTION OF THE DRAWINGS

The novel and distinctive features of the invention are set forth in the claims appended to the present application. The invention itself, however, together with further objects and advantages thereof may best be understood by reference to the following description and accompanying drawings in which:

DESCRIPTION OF PREFERRED EMBODIMENTS

Figure 1:
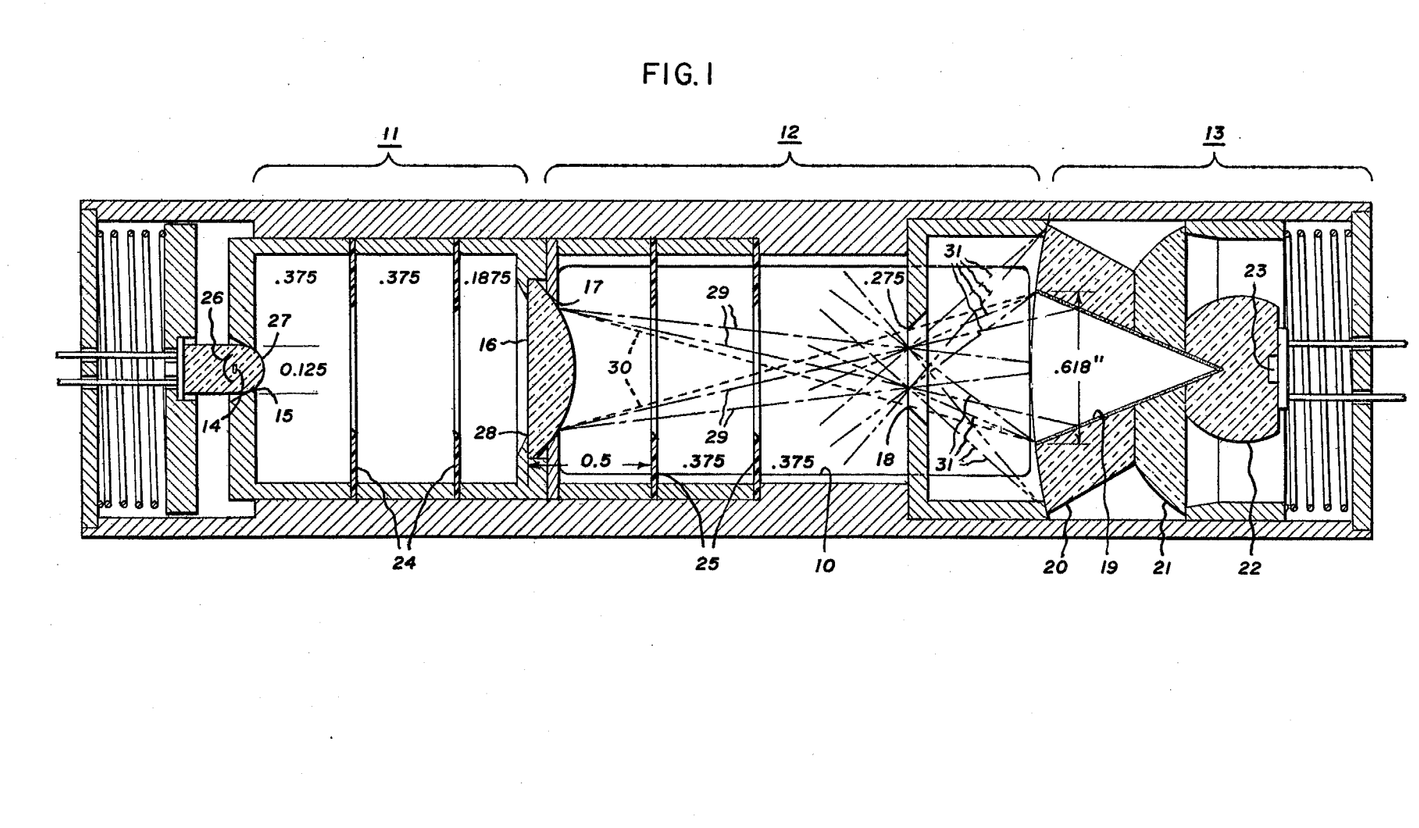
FIG. 1 is a cross-sectional view of a first embodiment of an optical smoke detector in which an air sample is illuminated and forward scattered light is collected to detect the presence of smoke.

Referring now to FIG. 1 there is shown in a first embodiment an optical smoke detector incorporating the invention. In the smoke detector, light is projected into a chamber containing smoke and the forward scattered light is measured to determine the smoke concentration. The optical components of the device are arranged in three light coupled, but generally light tight, coaxially arranged cylindrical compartments 11, 12 and 13. A light source 14, an aperture 15 for the light source and a beamforming lens 16 are housed in the first or anterior chamber 11. The anterior chamber is sealed to avoid the admission of smoke or dust. The measurement chamber 12 has two openings 10 to the outside air for the admission of airborne particles of combustion, i.e., smoke, and is shielded to avoid light coupling, except to the anterior and posterior chambers, by a housing, which consists of two U shaped overlapping box members. The measurement chamber 12 contains an aperture 17 for admitting light from the anterior chamber, the aperture 17 being associated with the beamforming lens 16; an aperture 18 internal to the chamber; and an output light stop 19. The light stop 19 is an opaque, blacked, conical cavity at the center of a three element output lens assembly (20, 21, 22). The stop 19 and lens element 20 form the boundary between the measurement chamber and the posterior chamber. The posterior chamber 13, which is also sealed against smoke or dust, is light coupled via the unstopped annular region of the lens element 20 to the measurement chamber. The posterior chamber contains the three element output lens assembly (20, 21, 22) and the photodetector 23. As will be shown, the output lens assembly is masked to avoid direct rays from the source (14, 15) and light from the principal scattering surfaces. The unmasked area of the output lens assembly collects light scattered by smoke near the internal aperture of the measurement chamber, and focuses it upon a photodetector 23.

Significantly, the smoke detector utilizes forward scattered light collected over a large solid angle in a dark field system to achieve a high smoke detector sensitivity. The output optics (20, 21 and 22) are positioned coaxially of the beam and the beamforming optics, in the direction of travel of the beam. This locates the output optics, which are centrally stopped to prevent direct illumination by the beam, in the forward light scattered region, where the scattered light from a given concentration of scattering smoke particles is one or two orders more intense than side or back scattered light. The second advantage of the coaxial arrangement is that the collection optics may surround the beam, and collect scattered light over the full annular area encircling the beam as opposed to a small segment of the annulus, when the collection lens is placed at a single off axis position. In the present arrangement, the output optics embraces a larger solid angle than conventional and the solid angle embraces the region of greatest scattering for greatest light collection, and greatest sensitivity. The smoke detector works upon the dark field principle with the output lens collecting zero light ideally in the absence of smoke and appreciable light in the presence of smoke.

The operation of the smoke detector will now be treated in detail together with a further treatment of the individual components. The light source 14, 15 is a pulsed, solid state light source designed for energy economy. The energy economy sought is to achieve a year's operation powered by a small dry cell. The light source is a semiconductor diode which emits light in the infrared or red portion of the electromagnetic spectrum. The unit is typically 0.2 inches in diameter and includes an opaque base and self-contained optics including a reflector 26 and a condensing lens 27 for producing light over a solid angle whose cross section is approximately 40 degrees. Since there is a ±7° uncertainty in the directivity of the emitted light with respect to the base of the "LED", the light which is actually collected by the beamforming lens 16 is normally restricted to a smaller solid angle where light emission is substantially certain. The solid angle in this embodiment is a solid angle whose cross section is approximately 26°. As noted above, the light source (14, 26, 27) is set into an ante-chamber 11 which is light tight except for an aperture (15) for admitting light from the LED and an aperture (17, 28) for projecting light into the measurement chamber. The outer limits of the LED light source are precisely defined by a circular aperture 15 through which the light is admitted into the ante-chamber. The aperture 15 is of a reduced diameter (0.138 inches) and is arranged at the tip of the lens (27) integral with the LED source. Light from the LED is collected by the lens 16 and formed into a beam which is projected into the measurement chamber 12.

The beamforming lens 16 is a lens of moderate power and moderate numerical aperture for uniformly illuminating a well defined region in the chamber near the center of the internal aperture 18. The lens 16 is an aspheric lens having a flat first face aligned toward the LED light source and a convex second face aligned toward the smoke chamber. The curvature of the lens 16 is designed to yield zero spherical aberration. The computer program by which the curvature is calculated takes into account the positions of both the "virtual source" and the image of the virtual source. The convex face of the lens is set into the aperture 17, 28, which forms the opening through which light is projected into the smoke chamber. The numerical aperture of the lens 16 is approximately 0.23. The lens 16 forms an image of the aperture source (14, 15) in the plane of the aperture 18, which is larger (0.1875 inches) than the source (0.138 inches) and located near the center of the internal aperture 18. In accordance with conventional principles of illumination, it is not the light emitting diode itself but rather the surface of the LED's integral lens which is the virtual source, imaged in the plane of the aperture 18. This optical design technique has the effect of producing a soft, even illumination in the plane of the aperture without loss of definition of the edge of the illuminated area. The internal aperture is made larger in diameter (0.275 inches) than the focused image (0.1875) and has a knife-edge (low radius) opening to reduce edge reflections into the output optics. This precaution insures that no part of the beam impinges on the edges of the internal aperture 18 and reduces edge reflections into the output optics. The illuminating beam whose marginal rays are illustrated by the dash-dot-dash-dot lines 29 is intercepted at the end of the smoke chamber by the conical stop 19, the stop being substantially larger than the intercepted beam. The light output from the measurement chamber is gathered in an annular region outside this stop.

The function of the foregoing elements, including the aperture LED light source (14, 15, 26, 27), the beamforming lens 16, the apertures 17, 28, 18 and the conical stop 19 is to illuminate a sample of air which may contain smoke in a manner suitable for dark field viewing. The elements are arranged along a common axis in such a manner that the beam of light formed by the lens 16 impinges on no surfaces that scatter any light into the annular output region surrounding the conical stop 19. If no smoke is present in the chamber, the passage of the beam illustrated by lines 29 through the chamber is unmarked and no secondary light scatterers in the beam are illuminated to deflect light outside the beam. Ideally, the field will be black under these conditions and the photodetector will produce no output. If smoke is present in the smoke chamber, then the beam contains secondary scatterers in the path of the beam from the entrance aperture 17 to the stop 19. These secondary scatterers become secondary sources of light which make the path of the beam a source of general illumination. When this occurs, all portions of the beam will scatter light, albeit unevenly, through a full sphere. A portion of the illuminated beam, and in particular that in the vicinity of the internal aperture 18, will scatter light visible from the viewpoint of the annular region surrounding the stop 19, where it will be collected by the output optics. The output field will be light and the photodetectors will produce an output.

Light scattering from sources other than smoke ordinarily does occur and must be kept to a minimum to obtain a dark field in the absence of smoke. Scattering centers occur within and on the surface of the lens 16, on the edge of the entrance apertures 17, 28, the edge of the internal aperture 18, the surface of the stop 19, and the walls of the anterior and measurement chambers. These scatterers become new sources of light, and if the interior of the measurement chamber is reflective, and propagation paths exist, they will cause light to be reflected into the output lens. Any background light collected in the output lens tends to reduce the sensitivity of the system to low smoke concentrations. As illustrated by the dotted lines 30, the apertures 16, 18 and conical stop 19 are placed to preclude any portion of the lens 17 from scattering light directly into the output optics.

The interior of the ante-chamber 11 and the measurement chamber 12, and the apertures and stops are designed to reduce internal reflections for increased smoke sensitivity. The internal surfaces are normally black, and may be ridged or coated with flock. The stop 19, for instance, if not carefully designed, may be a principal secondary source of light scattered into the output optics. When illuminated by the beam, the stop 19 may reflect some light back toward the wall of the internal aperture 18, where a second reflection will convey that light to the output optics. Similarly, light scattered from the interior or either surface of the beamforming lens 16 may enter the output optics. While direct rays from the surfaces and interior of the lens 16 are masked from the output optics by the apertures 17, 18 and stop 19, as noted above, light scattered from the lens can illuminate a side wall of the chamber and after a single reflection be collected by the output optics. Background light from both causes may be reduced to a level where the background light contributes less than 10% of the light output at the desired maximum (typically 1%) smoke sensitivity. For this reason, when the stop 19 is formed as a conical cavity, nonreflectively and opaquely coated, the back reflections into the chamber can be reduced below the critical level. Similarly reflections along the cylindrical side walls of the ante-chamber, and the measurement chamber can be reduced below the critical level by employing a low reflectance coating and annular baffles (two in each side of the chambers). In the ante-chamber, two baffles 24 will capture all single "bounce" reflections originating from scattering in the lens 16 and its aperture 17. Assuming that the ante-chamber is coated with low reflective material, this is normally adequate. Similarly, two baffles 25 in the measurement chamber 12 are usually adequate to capture most single "bounce" reflections originating in the ante-chamber in the beamforming lens 16 and its aperture 17. The baffles in each case extend inwardly a fixed distance toward but not touching the beam and terminate in a coaxial aperture, preferably knife-edged (low radius) to avoid reflections.

The output optics consists of the three element output lens 20, 21, 22, the photodetector 23, and the aperture 18 and the stop 19, which define the zonal field of the output optics. The field of view of the output optics may be described as a polar zone of a sphere centered on the optical axis of the detector, in which a portion of the polar zone is removed from the field by a stop also centered on the axis. The output lens 20, 21, 22 collects light throughout the annular or "zonal" surface outside the central stop and inside the cylindrical wall of the detector. The field of view of the output lens is illustrated by four pairs of lines 31 shown as a dash-dot-dot-dash-dot-dot. As earlier noted, the output optics collects the forward scattered light from the beam, while at the same time being masked to avoid collecting light in the beam per se or from the principal scatterers. The light stop 19 is an opaque, blacked, conical cavity at the center of a three element output lens assembly (20, 21, 22). The cone is of maximum cross section at the first lens elements (20, 21, 22). The cone is of maximum cross-section at the first lens element 20, of lessor cross-section at the second lens element (21), and the apex of the cone enters the last immersion element (22). The cone is dimensioned to leave a carefully defined annular surface area of the first lens element 20 unmasked for light collection, and to avoid interference with the useful rays which have been collected as they pass through the initial (20) and the two succeeding elements (21, 22) of the output optics.

The output optics (20, 21, 22) has a focal length designed to focus the illuminated airborne scatterers in the plane of the aperture 18 on the photodiode 23. If there are no such scatterers, there will be no lighted image to focus on the photodiode, and ideally no light output. The first element in the output lens is a double convex element 20 of high power. Since the central region of the lens 20 is masked by the stop 19, only the annular region extending radially beyond the mask to the perimeter of the lens is active optically. The front surface of the element 20 is of spherical curvature and of low power relative to the back surface to facilitate gathering light diverging widely from the axially placed scatterers near the lens. The unused central portion of the lens 20 may be the same spherical curvature, or flat, or partially hollow, as shown. The active back surface of the lens 20, and in particular the annular region in the path of useful rays from the surface, is aspheric. The actual curvature of the back surface is calculated to reduce spherical aberration to zero and of a higher power than the front lens surface. The second lens element 21 has a convex front face of annular shape that is of comparable power to the back face of the first lens and which may be either aspheric or spheric. The optically active back surface of the second lens is flat. To reduce the overall axial depth of the lens, both the unused central portion of the first (20) and the unused central portion of a second (21) lens are flattened and the flattened faces are joined. As noted above, the conical stop passes through both the first and second lens elements. The third and final element in the output lens assembly is an immersion lens 22 into which the output photodiode is cast. It is spheric, and may be of a somewhat smaller solid angle than a hemisphere. An advantage of an immersion lens is that it avoids two air interfaces which cause light losses at the exit of the immersion lens and at the entrance face of the photo voltaic diode 23.

In obtaining the necessary power, the three elements indicated are necessary. The initial lens 20 is designed such that a ray from the center of the aperture 17 diverging 45° is deflected into a converging path (typically 15°), while the ray from the lower edge of the aperture (as viewed in FIG. 1) is brought into parallel with the axis, and the rays from the "upper" limit of the aperture is brought into a path converging 30° toward the axis. The second lens element 21 produces an additional average convergence of about 30° so that all collected rays strike the surface of the final immersion element 22 at an average convergence angle of approximately 45°. A ray originating at the center of the aperture 18 will thus be bent 90° as it impinges on the surface of the immersion lens 22. The immersion lens is arranged to collect light over a large solid angle without substantially increasing the angle of deflection. The immersion lens increases the apparent size of the photo diode to the converging rays from the lens element 21. The computer program by which the lens surfaces were computed was designed to produce a zero spherical aberration for a source located in the plane of the aperture 18 imaged at the position of the photo diode.

The region of the measurement chamber near the aperture 18 is that which enters primarily into the smoke detection process. Light can only be collected from smoke particles that are within the confines of the light beam. This region is defined by the dash-dotted lines 29. In addition, light can only be collected from illuminated scatterers that are within the field of view of the output optics. This field of view is defined by the dash-dot-dotted lines 31. Finally, only those rays that have met the foregoing two criteria, and which enter the collection lens in a direction to strike the detector 23 will in fact be detected and measured. The image of the detector, using the reciprocal properties of the output lens (20, 21, 22) largely fills the aperture 18, being a square 0.2" by 0.2". Thus, some of the rays of a scatterer in the conjectured image position of the detector will impinge on the detector and be detected. Scatterers just outside the image position but in the same plane will generally not produce detectable rays. Similarly, rays originating in scatterers axially displaced from the image will produce some rays which will impinge on the detector and be detected and some that will not. In practice, these qualifications define a smoke sensitive region near the aperture 18, which extends axially both toward and away from the plane of the aperture 18.

The optical design has been optimized for realization as an economical mass produced product. In reaching that design, it was taken to be essential that the dimensions of the optical system should remain compatible with conventional enclosures now common in the market place. These set a maximum thickness of 1" to 1½" and a maximum overall length of 5" to 6" on the optical elements. In addition, the lenses should be capable of low cost mass fabrication, i.e., be cast plastic lenses and the photo diode, which is a major item of cost and whose cost is proportional to size, be of minimum size (i.e., 2.5 mm by 2.5 mm).

Assuming that the maximum diameter of the lens system is a primary design constraint, the size of the photo detector is minimized by immersing the detector in an optical material of a high index of refraction (injection molded "SAN", n=1.57) and by maximizing the regular subtense of the output lens as seen by the detector. At the same time, on the front surface of the output lens toward the smoke chamber, the angular subtense of the lens as seen from the internal aperture 18 where the illuminating beam is most concentrated, will also be maximized. An iterative computer program demonstrated that the scatter light collection efficiency is maximized if scatterers in the plane of the internal aperture (18) are imaged on the detector by the output optics. The program includes a factor for the scatter efficiency as a function of the scattering angle.

Given a constraint on the total length of the system (e.g., <5 inches), and after the axial length of the output optics from internal stop 19 to photodetector 23 has been reserved (e.g., 1¼ inches), the distance from source to beamforming lens 16 and from the lens 16 to the internal aperture 18 were selected to minimize the size of the stop (19) on the output optics. This latter factor again maximizes the solid angle over which light scattered from the smoke is collected. The latter dimensional constraint dictates the focal length of the beamforming lens (0.6 inches). Since the beamforming lens should, on the average, collect light over an angle that will be illuminated, if diodes with a 7° to 9° directional error are to be used interchangeably, the angular subtense of the beamforming lens should be reduced from the 40° angular cross-section available from a given diode, to the 20° to 26° angular cross-section that all diodes will illuminate.

An important factor in the lens design is the correction of spherical aberration. The effect of an oversized image on the photodetector is to waste the scattered light and thus reduce the sensitivity of the system. At the output optics (20, 21, 22), an uncorrected lens of the correct power creates a blurred image on the output diode, which is three times the size of the corrected image. The back face of the first lens element is of greatest concern and must be a calculated aspheric surface. The front face of the second lens element may be spheric, although a more concentrated image will be formed if the lens is aspheric. The output element may be of a simple spherical section. In the input optics, a similar problem occurs. The input optics are designed to collect the most light and concentrate it without impingement on the internal aperture 18 to the smallest size on the stop 19. A spherically uncorrected lens creates an image of double the size. If the beam at the aperture 18 is doubled, then the aperture 18 must be doubled, and the circular stop 19 must also be approximately doubled to mask the output optics from the scattering surfaces of the lens 16. If the stop 19 is doubled, an intolerable reduction in the area available to the output optics results.

The optical elements in a first embodiment had the following dimensions:

Lens 16 (optical material styrene acrylonitrile (SAN) n=1.57)
Front Surface Flat
Back Surface:

| Distance to Axis | Thickness |
|---|---|
| 0.350 | 0. |
| 0.320 | 0.029 |
| 0.290 | 0.056 |
| 0.260 | 0.080 |
| 0.230 | 0.102 |
| 0.200 | 0.122 |
| 0.170 | 0.139 |
| 0.140 | 0.154 |
| 0.110 | 0.165 |
| 0.080 | 0.175 |
| 0.050 | 0.181 |
| 0.020 | 0.185 |

Output Optics:
Lens Elements 20, 21 (optical material SAN n=1.57)
Front Surface 2.38" radius (spherical)
Back Surface:

| Distance to Axis | Thickness |
|---|---|
| 0.550 | 0. |
| 0.520 | 0.052 |
| 0.490 | 0.102 |
| 0.460 | 0.151 |
| 0.430 | 0.197 |
| 0.400 | 0.241 |
| 0.370 | 0.282 |

Lens Element 21 (n=1.57)
Front Surface 0.78" Radius (spherical)
Back Surface Flat
Lens Element 22 (n=1.57)
0.3" Radius (Spherical)

The foregoing optical design represents a particularly sensitive smoke detection arrangement. The basic design allows one to collect forward scattered light in a zone centered about the axis of the beam, where the scattering is of greatest intensity. In addition, the arrangement of the light beam and the collection optics on a common axis allows the light scattered by individual scatterers to be gathered around the zone in an annular region, permitting a larger solid angle than ordinarily feasible if the light is collected from a single off axis position.

Prior to a description of the second embodiment, optimization performance of a compact design will be treated. The design of the prior embodiment and that to be described were optimized in an iterative computer program with the objective of maximizing the total amount of scattered light power collected from a unit concentration of smoke within size and stray light constraints. The size constraints dictated an overall length of the system of preferably less than 5" and a cross-sectional dimension of less than an inch and a quarter. The stray light constraint is that the amount of light power impinging on the detector in the absence of smoke in the measurement chamber be less than one third the scattered light that would be received from the minimum detectable concentration of smoke contemplated in the design. The sensitivity requirement is established with reference to conventional low cost electronic circuitry for reliable response when the measured light output exceeds the established minimum value.

The design considerations may be regarded as falling into two categories—those which are mandatory and those discretionary considerations which allow trade-offs or compromise. The mandatory requirements have generally been indicated as the description has progressed. These include the requirements for establishing dark field operation, and more particularly that the beam projected from lens 16 not impinge on the output optics (lens 20), but be stopped by the aperture stop 18; that no part of the lens 16, which may contain scattering particles be visible to the output optics (lens 20); that the beam projected from lens 18 not impinge on the edges of the aperture of stop 18; that none of the stray light be able to reach the output optics in less than two reflections (assuming minimum reflectivity surfaces); and that the light source 26, an LED device subject to variation during manufacture in beam orientation with respect to the envelope, cast an amount of light flux on the beamforming lens 16, which does not vary as LEDs are interchanged. Constancy in the light flux from the light source is achieved without the need for individual adjustment, by sacrificing the light in a wide enough margin of the beam to insure that the solid angle intercepted by the beamforming lens always be fully illuminated.

The discretionary factors, assuming that the outer dimensions are fixed, are then sequentially and iteratively considered until the optimum design is achieved. The strongest factor influencing sensitivity is the solid angle of light from scattered smoke collected by the output lens (20, 21, 22). Assuming a given solid angle of scattered light collection, the collection efficiency of the output lens is large for scattering angles just slightly deviated from the axis of the beam and small for angles perpendicular to the axis of the light beam. Disregarding the greater light loss than occurs with increasing glancing light incidence of rays on the first surface of the output lens (20), the intensity of scattering light collected by the output lens follows an empirically observed exponential curve $$E = 0.1 \exp(2.7\phi)$$

where $\phi$ is the forward scattering angle, assigned a value of zero degrees perpendicular to the beam axis and 90° extending from the source parallel to the beam axis. In the range of from 2° off perpendicular ($\phi=2°$) to 14° off axis ($\phi=76°$), the scattering efficiency (E) for white smoke at 632.6 nanometers wavelength varies from 0.1 to 3.2 relative magnitudes corresponding to a 1 to 32 range of variation.

Figure 2:
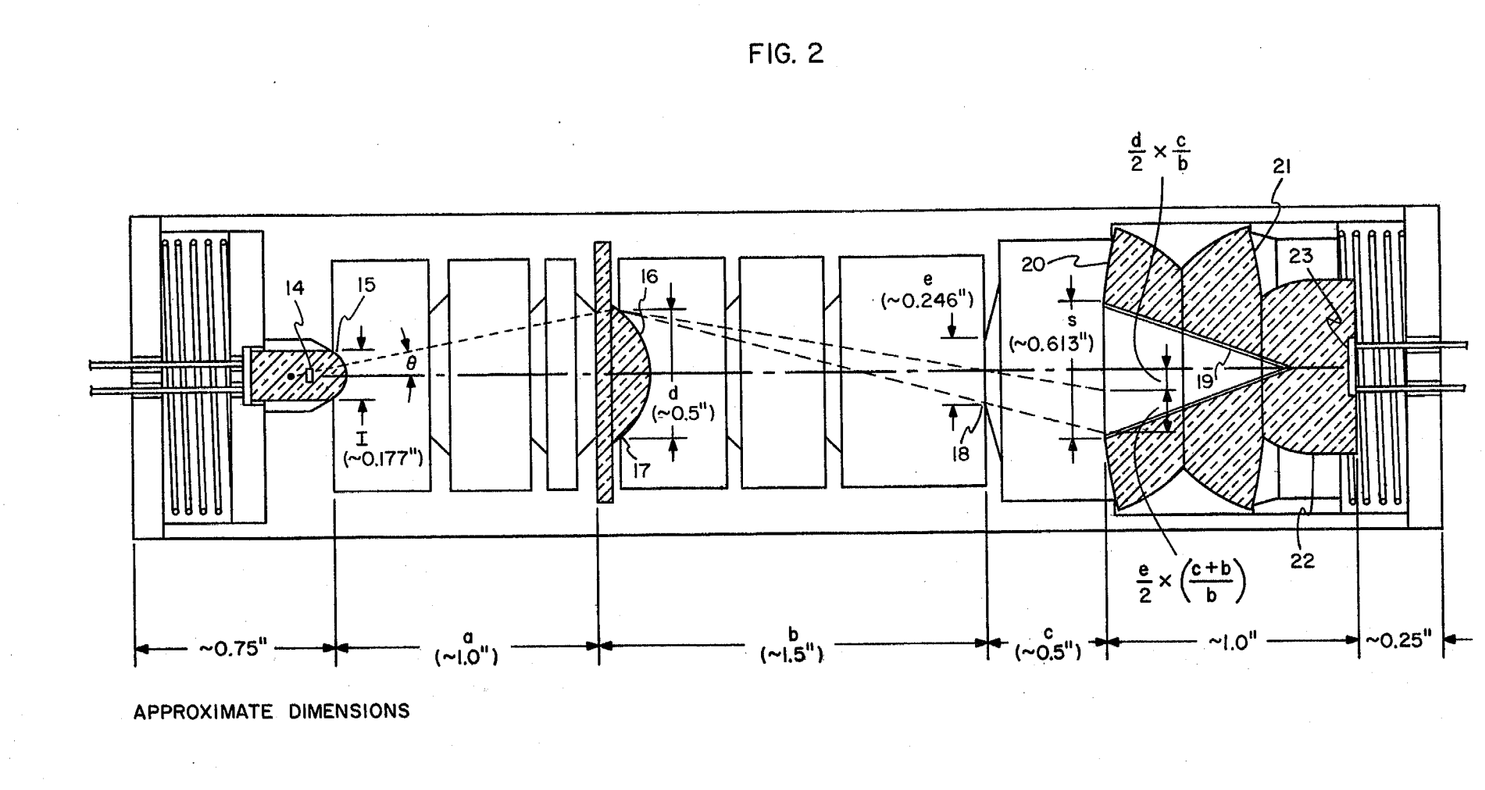
FIG. 2 is an optical schematic of an optical smoke detector in accordance with the invention in which the parameters influencing optical efficiency are indicated.

Because of the strong forward scattering efficiency function, the scattering collection efficiency is always maximized when the diameter "e" of the light trap 19 (see FIG. 2) is minimized. Consequently, the first step in the optimization procedure is to determine the system dimensions such that "s" is minimized. In FIG. 2, the purpose of the aperture stop 18 of diameter "e" is to mask the output lens (20) from the beamforming lens (16) in an aperture stop 17 of diameter "d" so that light scattered from the surface of the beamforming lens cannot reach the output lens. The diameter "e" of the aperture stop 18 must be larger than the image of the light source (14, 15) which is focused in the same plane in order to avoid edge illumination or diffraction effects which would transfer unwanted light into the output lens. The stop (15) of light source 14 has a diameter "I". Focusing the image of the light source in the plane of the aperture stop 18 minimizes the image in that plane, and correspondingly minimizes the size of the stop required to mask the beamforming lens from the output lens.

The minimum size of the aperture stop 19 is defined by the geometry depicted in FIG. 2. The beamforming lens 16 is arranged in the aperture stop 17 at a distance "a" from the light source 14 set in stop 15. The aperture stop 18 is arranged a distance "b" from the beamforming lens 16 and a distance "c" from the conical stop 19 on the surface of the output lens. A ray drawn from a point on the edge of the aperture stop 17 through the center of the aperture stop 18 would impinge in the plane of the output stop 19 at an off-axis distance $(d/2) \times (c/b)$. In other words, assuming a reduction of the radius of the aperture stop 18 to zero, the conical stop would still require a radius of $(d/2) \times (c/b)$ to mask the beamforming lens 16 from the output lens 20. Since the radius of the aperture stop has a value of (e/2), a ray traced from a point on the edge of the aperture stop 17 and touching a diametrically placed point on the opposite edge of the aperture stop 19 is ("e"/2), units below the axis of the aperture 18 and proportionately further below the axis at the stop 19:

$$\frac{e}{2}\left(\frac{c+b}{b}\right) \quad (1)$$

Adding, the output stop 19 should have a minimum half diameter (S/2) equal to the sum of these two factors:

$$\frac{s}{2} = \left(\frac{d}{2} \times \frac{c}{b}\right) + \frac{e}{2}\left(\frac{c}{b} + 1\right) \quad (2)$$

The relationship of the internal stops is in turn dependent on the design of the light source 14, 15 at the input side of the comparator and the size of the light detection element 23.

The selection of the light source is influenced by two variables and manufacturing tolerances. The light source is an LED, which may be characterized as having a beam size covering one of a variety of solid angles, normally between 10° and 40°, a certain source diameter "I" typically between 0.045" and 0.150", normally defined by the entrance aperture 15, and tolerances which apply to both variables and the beam orientation with respect to the mounting surfaces of the light source.

The light source 14, 15 of diameter "I" is imaged in the aperture stop 18, and defines the minimum size of the aperture stop 18:

$$(e/2) = (I/2) \times (b/a) \quad (3)$$

This relationship, while explicitly stating the axial disposition of the light source 14, 15, beamforming lens 16, and aperture stop 18, assumes implicitly that the lens 16 will have the power required to focus the image in the plane of the aperture.

The solid angle of illumination accepted in the comparator is defined to be "$\theta$". The tangent of $\theta$ is established by the ratio of half the stop diameter "d" to its distance "a" to the light source $$\tan\theta = (d/2a) \quad (4)$$

The conical stop dimension (s/2), defined in terms of the source size (I), the illumination angle $\theta$, and the axial dimensions a, b, and c may be obtained from expression (2) by substituting for d and e:

$$\frac{s}{2} = \frac{ac}{b}\tan\theta + \frac{I}{2} \times \frac{c}{a} + \frac{I}{2} \times \frac{b}{a} \quad (5)$$

Differentiating the above expression in respect to "b" and setting it equal to zero, Expression 5 is minimized when "b" assumes the following value:

$$b = a\sqrt{(2/I)c \tan\theta} \quad (6)$$

This yields a minimum trap diameter "s" of $$s = \frac{Ic}{a} + \frac{2Ib}{a} = \frac{Ic}{a} + 2\sqrt{I2c \tan\theta} \quad (7)$$

Expression (7) indicates that the minimum stop diameter "s" is a direct function of the size of source "I", the distances "c" and "b" and an inverse function of the distance "a".

Assuming a limitation (e.g. 1.1) on the diameter of the optics and an overall limitation in length (e.g. 5"), the computer simulation permits one to optimize the design in respect to the parameters of Expression (7). Given a set of input parameters, i.e. a, c, I, the computer calculates the optimum value of "b" using the preceding formulae. The computer then calculates a figure of merit for the scattering efficiency or system sensitivity. In this calculation, the computer performs a numerical integration over area of the light collected from the interaction volume (near the aperture 18) for each combination of input parameters selected. The light intensity from the LED illuminating the elemental area is entered and then the scattered light is numerically integrated over scattering angle using elemental ray bundles. The scattered light calculation uses the empirical formula: $E=k_e 2^{-78}$ mentioned earlier. The area integration is carried out over the field of view of the detector. The foregoing process comprises one iteration of the computer simulation. Selected parameters are then modified in value by a small amount (automatically as part of the program) to continue the iterative procedure and search for an optimum design.

In the foregoing calculation, the overall length limitation is assumed to be equal to $a+b+c+2"$. The two inch addition includes 1" allocated to the axial depth of the output lens 20, 21, 22. It also includes the approximately $\frac{3}{4}"$ extension of the LED 14 and its housing behind the aperture 15, from which "a" is measured and the typically $\frac{1}{4}$ extension of the photodetector 23 and its housing behind the back surface of the immersion lens 22. The spacing "c" is optimized at a minimum value consistent with the fastest practical lens design having an approximately 1.1" clear aperture. The realization is the three element output lens 20, 21, 22 previously described, the last element of which is an immersion lens for the photodetector. (Extensive truncation is used to minimize the axial extent of this part of the optics and in the practical case reduces the depth of the three lenses to just under 1".)

Figure 3:
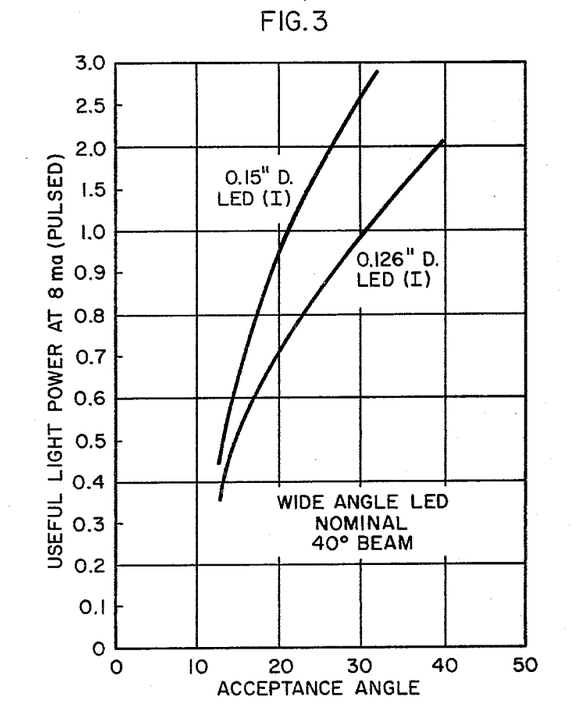
FIG. 3 is a graph of the useful light power of an LED light source having a broad beam plotted against the acceptance angle of the beamforming lens.

Optimum use of available high efficiency LED's is important. The measured power output into the optical comparator was calculated as a function of the aperture. These quantities are plotted in FIG. 3 for a wide beam (40°) LED with a 0.150" and a 0.126" stop. As illustrated in FIG. 3, the larger stop (I) introduces more light flux into the comparator for a specified 8 milliampere current. Larger acceptance angles also introduce more light flux. At larger angles, however, the rate of flux increase diminishes as the acceptance angle begins to embrace the full beam. The increase in light flux introduced into the optical system by increasing "I" and "θ" is counteracted by the need to increase the size of the central stop "s" to mask the beamforming lens from the output lens, which in turn decreases the input flux collected at the photodetector. This relationship is mathematically accounted for by setting the differential of "s" in respect to "b" to zero and solving for the minimum value of "s" expressed in terms of the system parameters as earlier indicated.

Figure 4:
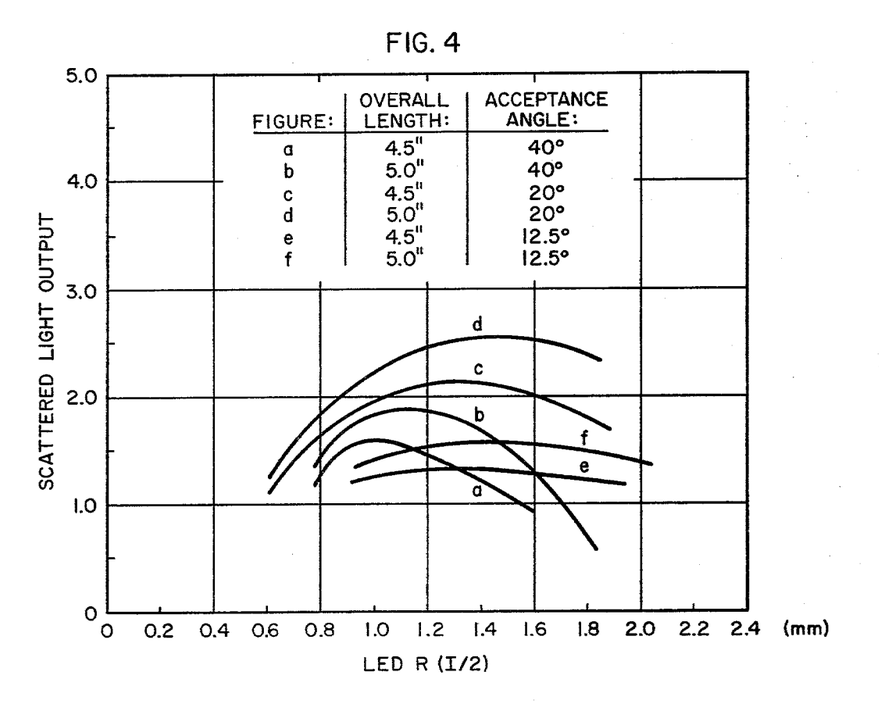
FIG. 4 is a collection of graphs illustrating optimization of the optical smoke detector with proper parameter selection.

For final comparator optimization, the computer is iterated through sequential values of "a", "I" and "θ" in the expression for minimum "s". The calculated curves are shown in FIG. 4. Taking the uppermost curve, which assumes an overall length (i.e. $a+b+c+2"$) of 5", and an LED acceptance angle of 20°, it may be seen that the scattering power peaks at an LED diameter (I) of approximately 3.0 mm. Comparison of the curves for a 5" overall length and a 4.5" overall length indicates a very substantial improvement with the greater length. The optimum diameter of the LED stop for the 4.5" length occurs at approximately 2.6 mm and the scattering power in arbitrary numbers falls from approximately 2.53 to 2.15. The foregoing curves were taken assuming an acceptance angle of 20°. If the acceptance angle is increased to 40°, the two curves corresponding to 5.0" and 4.5" overall lengths are both displaced downwardly by substantial increments. In particular, the curve corresponding to an overall length of 5" now peaks at a value of approximately 1.87 at a 2.2 mm stop diameter. If the acceptance angle is reduced to 12,5°, the two lowermost curves in the figure are obtained.

The computer curves are intructive of the improvement in performance achieved through computer optimization. The acceptance angle $\theta$, under the indicated dimensional constraints, produces a relatively low sensitivity at 40° and a reltively low sensitivity at 12.5° and a relatively high sensitivity at 20°. The performance penalty for not optimizing with respect to the "θ" parameter alone is from 2.54 to 1.87 or from 2.54 to 1.56 in relative units. The LED stop diameter is equally significant. Using the optimum curve, the performance which optimizes at 2.54 relative units at a 3.5 mm stop diameter falls to 1.2 relative units at a 1.2 mm stop diameter. While not plotted, the performance also quickly degrades by a like amount when the stop diameter exceeds 3.0 mm. Another insight may be gained by comparing the curves corresponding to the 4.5" overall length with those corresponding to 5.0" overall length. An increase in length in each of these examples produces an improvement in performance. General principles indicate that the performance will increase continuously with increasing expansion of the comparator base line, assuming re-optimization of the individual parameters, while the other two factors-plotted, the "θ" and "I" must be optimized at intermediare values, because of the strong counteractive effect of the stop diameter "s".

Taking up the initial assumption that the entrance aperture of the beamforming lens must always be filled with light flux, a mandatory requirement assumed in using the computer program, and assuming an optimization of 20° for "θ", and a variation of 15° in the beam orientation with respect to the LED housing, one should use an LED light source having a beam in excess of 35°.

Two practical embodiments satisfying the dimensional constraints are herein described. The second embodiment employs a moldable acrylic (PMMA) for the lens elements. A suitable material is an optical quality "Plexiglass" plastic material V811-100 obtainable from Rohm and Haas. This material may be injection molded and exhibits an index of refraction of 1.49. In this embodiment, the overall length of the optical comparator is 5" and the cross section is $1\frac{1}{4}"$. The first $\frac{3}{4}"$ along the axis is taken up by the LED light source; the distance "a" between the stop 15 and the front surface of the beamforming lens 16 is 1"; the distance "b" between the front surface of the beamforming lens 16 and the aperture stop 18 is $1\frac{1}{8}"$; the distance "c" between the aperture stop 18 and the conical stop 19 at the front surface of the lens element 20 is $\frac{1}{2}"$, the output lens assembly including the photodiode and the plate takes up $1\frac{1}{4}"$. The critical axial dimensions and those of the apertures and stops including tolerances are:

a=0.854±0.02"

b=1.5±0.02"

c=0.5±0.01"

d=0.5±0.005"

e=0.246±0.003"

I=0.177±0.003"

s=0.618±0.005"

Prior to a treatment of other aspects of this second embodiment, the effect of varying the dimensions from the indicated optimum values may be considered. If optimum proportions are used in the spacings a, b and c, then sensitivity is proportional to device length as noted earlier and proportional to the square of diameter. This implies that a relaxation in size constraints will improve the comparator performance. In practice, expanding the cross sectional comparator dimensions does not affect the relative proportions of the spacings a, b and c, while axial expansion does.

The following chart lists the effects of a 20% change in the parameters assuming the 5" overall length and the 1¼" diameter of the first embodiment.

| Multiplier | Parameter | 35-EL-1460 Sensitivity (Based upon 100% for our design) |
|---|---|---|
| .8 | a | 60% |
| 1.2 | a | 85% |
| .8 | b | 63% |
| 1.2 | b | 65% |
| .8 | c | 80% |
| 1.2 | c | 75% |
| .8 | d | 60% |
| 1.2 | d | 80% |
| .8 | e | excessive stray light |
| 1.2 | e | 47% |
| .8 | s | excessive stray light |
| 1.2 | s | 50% |
| .8 | I | 80% |
| 1.2 | I | 84% |

While a working arrangement may tolerate ±20% deviations from the ideal, in most individual parameters, the "c" and "s" parameters are exceptionally sensitive and a ±10% deviation produces a comparable degradation in performance.

Returning to a description of the second embodiment, the lens elements differ from the prior embodiment. In the second embodiment, the beamforming lens 17 is integrally molded with a thin flat disk which extends beyond the active portion of the lens and which provides for more accurate lens positioning. The output lens is designed with the first element and the second element being alike, both being assymetrical and placed with the strongest assymetrical surfaces adjacent and the spherical low power surfaces non-adjacent. All three lenses are truncated in the region masked by the stop 19 to minimize the depth of the assembly.

Lens 16 (PMMA V811-100) n−1.49"
Front Surface Flat.
Back Surface:

| Distance to Axis | Thickness |
|---|---|
| .290–.500 | 0.0651 |
| .260 | 0.0930 |
| .230 | 0.1180 |
| .200 | 0.1400 |
| .170 | 0.1590 |
| .140 | 0.1751 |
| .110 | 0.1883 |
| .080 | 0.1984 |
| .050 | 0.2055 |
| .020 | 0.2096 |
| .000 | 0.2107 |

Output Optics:
Lens Elements 20, 21 (PMMA V811-100) n=1.49
One Surface 60.4 mm radius (spherical)
Other Surface:

| Distance to Axis | Thickness |
|---|---|
| .550 | 0.0000 |
| .520 | 0.0460 |
| .490 | 0.0911 |
| .460 | 0.1345 |
| .430 | 0.1753 |
| .400 | 0.2132 |
| .370 | 0.2480 |

Lens Element 22 (n=1.49)
0.33" Radius (spherical)

The lenses 17 and 20, 21 and 22 are essentially light gathering lenses with the minimum high frequency response requirements characteristic of this function. This means that the precise curvatures of the elements may vary slightly from the optimum design values without adversely affecting the sensitivity of the optical comparator. In a practical case, using the indicated acrylic (PMMA) optical material, the lenses were fabricated in a mold established at the desired design dimensions. After cooling and tempering, the final lens design was found to have shrunk in a non-uniform manner which tended to be disproportionately greater for the larger dimensions and to generally increase the curvatures. The effect was to force a slight shortening of the "b" design distance between the aperture stop 18 and the beamforming lens 17, but no other significant effect was found upon the light gathering efficiency or positioning of the output lens assembly 20, 21, 22.

The electrical output element is the optical detector 23 adhered to the last element of the output lens assembly in a shallow rectangular recess provided for the purpose. The dimensions of the recess are approximately ¼" and permit a photodetector whose active surface is approximately ⅛" square.

The electrical transfer function of the optical smoke detector is measured in terms of the output signal (1 millivolt into 1 megohm being typical) that a given detectable level of smoke (typically 1%) will produce from a given level of current (10 milliampere) used to operate the LED light source under pulsed operation.

While a single embodiment has been shown and described, it should be evident that certain modifications may be made without departing from the invention. In particular, the first two elements of the output lenses may be back to back Fresnel lenses arranged around the central stop. The disadvantage in using Fresnel lenses in a low cost embodiment are that even if molded, they must be mounted with considerable concentric accuracy in relation to the ruling interval. This problem of registration may be avoided if one uses a Fresnel lens and a non-Fresnel lens. The optical system may also use a narrow beam LED light source, but unless the orientation of the light source is adjustable much of the light may be lost in a given device. If the LED is adjustable, then a separate beamforming lens may not be needed, providing one is willing to pay a penalty of about 10% in the "quality" of the integral beamforming optics. If the 10% increase in efficiency is desirable, a beamforming lens should be employed and it will then re-image a "virtual source" consisting of the surface of the LED and its defining aperture. Assuming a beamforming lens is used, and that alignment is impractical, one should normally use a wide beam LED. The selection of measures to reduce internal reflections are largely dictated by the size and configuration of the enclosure. If larger dimensions are tolerable than those indicated, then the baffles to avoid reflections may be unnecessary.

What is claimed as new and desired to be secured by Letters Patent of the United States is:

1. A particle detector of optimized optical efficiency having restricted axial dimensions and using a dark field optical system in which a gaseous sample is illustrated and forward scattered light is collected in a zone centered about, but excluding on-axis light, and sensed to detect the presence of suspended particles in the sample, comprising:
   A. a measurement chamber into which a gaseous sample is admitted, said chamber containing an entrance aperture, a zonal exit aperture containing a central stop, and an internal aperture, said chamber otherwise excluding light, said apertures and stop being perpendicular to the detector axis and centered thereon;
   B. beamforming means comprising:
      (1) a narrow band light source,
      (2) a lens at said entrance aperture for projecting a beam of light from said source along said axis for illuminating suspended particles present in said chamber, said lens imaging said source in the plane of said internal aperture to a size smaller than said internal aperture to preclude beam impingement and to allow beam interception by said central stop, said beamforming lens being of an aspheric design calculated to correct spherical aberration for a point source at predetermined object and image distances and produce a sharp image of said light source;
   C. said entrance aperture, said internal aperture and said central stop being arranged to prevent light scattered from said beamforming lens from impinging on said zonal aperture;
   D. an output lens arranged in said zonal aperture for collecting scattered light, said output lens being blocked to the rays of said beam or scattered by said beamforming lens, but collecting forward scattered light when airborne scattering particles are in said measurement chamber, said output lens being a three element annular lens of high power having at least one aspheric surface calculated to correct spherical aberration for a point source at predetermined object and image distances and produce a sharp image of scattering particles present in said internal aperture, the central region of the more powerful face of each element of said output lens being truncated approximately to the obscuring diameter of said central stop to reduce the axial extent of said output lens, and
   E. a light detector for sensing the scattered light collected by said output lens, said image of scattering particles being focused upon said light detector and being of the approximate size of said light detector, said aspheric lenses permitting large numerical apertures and short focal lengths for maximum optical efficiency within a given axial dimension.

2. An arrangement as set forth in claim 1 wherein
   A. the front surface of the first element of said output lens is of low power to facilitate collection of highly divergent light, and the back surface of said first element is aspheric and of higher power than said front surface, and
   B. the back surface of said second element is of low power to facilitate a large convergence angle and the front surface of said second element is of higher power than said back surface.

3. An arrangement as set forth in claim 2 wherein said light detector is of small extent, and the third lens element of said output lens is a hemispheric immersion lens, coupling light over a wide angle of said light detector.

4. A particle detector as set forth in claim 3 wherein the first two elements of said output lens each have one aspheric surface calculated to correct spherical aberration and focus rays deflected from scattering particles present in said internal aperture on said detector.

5. The arrangement set forth in claim 1, wherein
   A. an anterior chamber is provided from which airborne particles of combustion are excluded, said chamber excluding light except for an exit aperture opening into said entrance aperture of said first chamber, said exit aperture being perpendicular to said axis and centered thereon, and wherein
   B. said narrow band light source is
      (1) a light emitting diode, and
      (2) a condensing lens adjacent and immersing said light emitting diode for forming the emitted light into a divergent beam, said diode and said condensing lens directing light through said anterior chamber along said axis, toward said beamforming lens at said entrance aperture.

6. The arrangement set forth in claim 5 wherein
   A. said condensing lens is set in a circular aperture for defining the edges of said light source at the other end of said anterior chamber,
   B. said beamforming lens collecting a major portion of light in the beam formed by said condensing lens and forming an image of the surface of said condensing lens bounded by said circular aperture in the plane of said internal aperture, said bounded image being smaller than said internal aperture to avoid illumination of the edges of said aperture.

* * * * *